3,320,134
METHOD OF REDUCING CARBON LOSS FROM GRAPHITE MODERATOR IN CARBON DIOXIDE-COOLED NUCLEAR REACTOR
Malcolm Frederick Sheppard, Sale, and Henry Chapman Cowen, Manchester, England, assignors to United Kingdom Atomic Energy Authority, London, England
Filed June 30, 1964, Ser. No. 379,308
Claims priority, application Great Britain, July 5, 1963, 26,835/63; Feb. 19, 1964, 7,026/64
3 Claims. (Cl. 176—38)

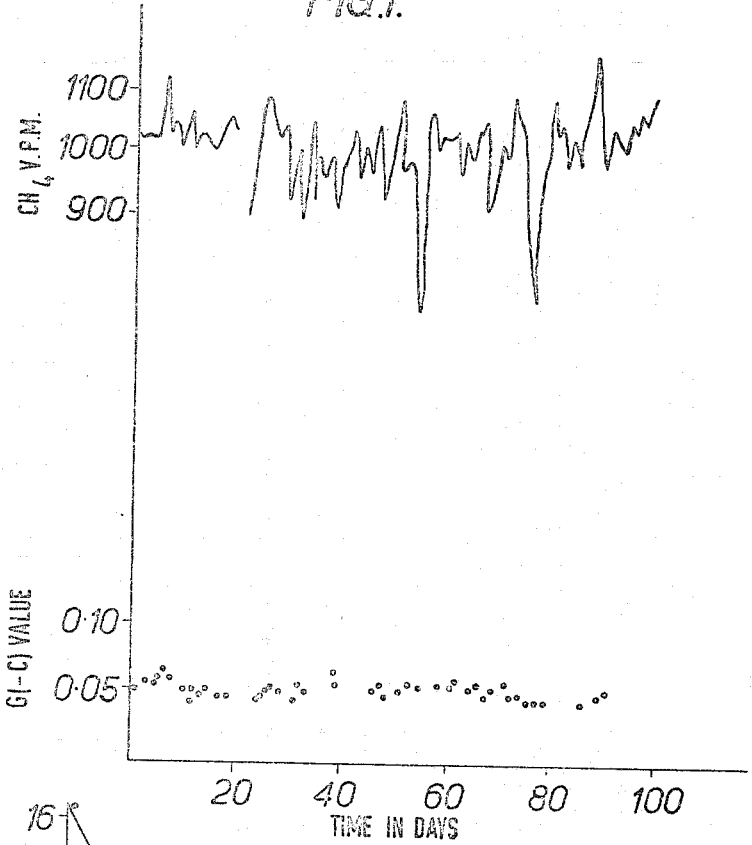
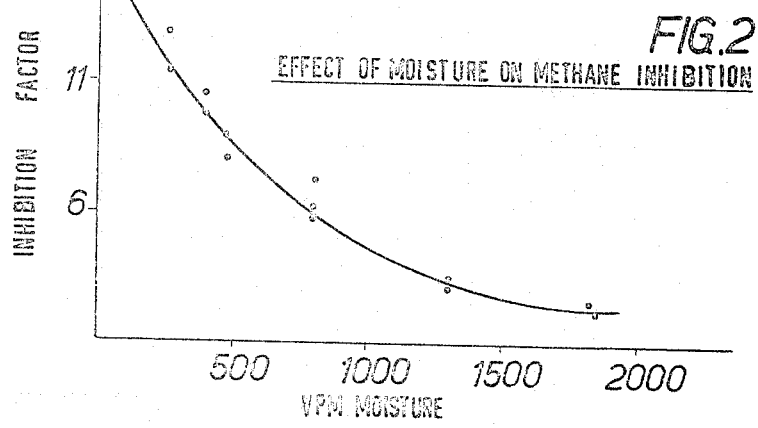

This invention relates to nuclear reactors having a graphite moderator and a carbon dioxide coolant which circulates through the reactor under pressure, the coolant being in contact with the moderator.

It is known that in such reactors reaction takes place between the graphite moderator and the coolant resulting in a loss of carbon from the moderator, and that the rate of reaction increases with the level of irradiation so that in highly rated reactors the loss of carbon from the moderator may be serious. The present invention is particularly concerned, therefore, with providing means of inhibiting the reaction and reducing the loss.

Our British patent specification No. 874,487 describes inhibition of the reaction by maintaining a quantity of carbon monoxide in the coolant, the quantity ranging from 0.5 to 10% by volume. The present invention is based on the discovery that the inhibiting effect of carbon monoxide is increased if a paraffin hydrocarbon is also added to the coolant.

The present invention accordingly resides in one of its aspects in the addition of a fluid paraffin hydrocarbon to the carbon dioxide coolant of a graphite moderated nuclear reactor.

It is at present believed that the inhibiting effect of the paraffin hydrocarbons is due to the absorption of the hydrocarbon itself or some radiolytic product such as methyl radicals on the surface of the graphite moderator. It has however been discovered that the concentration of paraffin hydrocarbons added to the coolant in accordance with the invention decreases gradually over a period of time and that, whilst the inhibiting effect does not immediately cease, for permanent protection of the graphite moderator, repeated additions of paraffin hydrocarbons at a controlled rate are considered necessary. Preferably the additions are continuous so that the preferred concentration of paraffin hydrocarbons is maintained in the reactor coolant.

The invention accordingly resides in a second aspect, in a carbon dioxide coolant for a graphite moderated nuclear reactor, the coolant containing at least 50 parts per million by volume of a paraffin hydrocarbon.

Paraffin hydrocarbons decompose under irradiation and methane will be formed in reactor coolant to which they are added even if it is not added specifically. Furthermore, the simplicity of methane makes it especially useful as an additive. Accordingly, the invention resides further in a carbon dioxide coolant containing at least 50 parts per million by volume of methane.

The inhibiting effect of the hydrocarbons is apparently reduced if water vapour is also present in the coolant and, in general, the less water vapour present the more effective the inhibition by the hydrocarbons present and the higher the methane concentration in the coolant the higher the total quantity of water vapour which may be tolerated. The influence of water vapour on the inhibiting effect is more noticeable with increasing concentrations, however, and it is preferable for the water vapour concentration to be less than one half of the concentration of methane in the coolant.

Carbon monoxide will always be present in carbon dioxide coolant due to break-down of the carbon dioxide under irradiation and may also be added deliberately. It has been found, however, that if a paraffin hydrocarbon is added to the coolant, in accordance with the invention, the quantity of carbon monoxide required to produce a satisfactory inhibiting effect may be reduced. Such a reduction is an advantage because it lessens the tendency for carbon deposition to occur in the coolant circuit outside the reactor. Examples illustrating the invention will now be described and reference will be made to the accompanying FIGURES 1 and 2 which are both graphs.

The following examples illustrate the inhibiting effect of the presence of methane.

*Example 1*

A specimen of graphite similar to that used for nuclear reactor moderator structures was exposed in a neutron flux of $3.6 \times 10^{13}$ to a stream of carbon dioxide. The pressure was approximately 210 p.s.i.g., the temperature about 350° C. A similar specimen was then exposed similarly to a stream of carbon dioxide containing 5.6 v/o carbon monoxide and 440 p.p.m. by volume of methane. With the methane and carbon monoxide present the weight loss of the graphite specimen was reduced by a factor of about twelve.

*Example 2*

The same kind of specimen as in Example 1 was exposed under the same conditions as in Example 1 to a stream of carbon dioxide containing 0.44 v/o carbon monoxide, and a similar specimen was exposed to carbon dioxide containing 0.44 v/o carbon monoxide and 500 p.p.m. by volume of methane. In this example the weight loss of the graphite specimen was reduced by a factor of six in the presence of the methane.

*Example 3*

Under the same conditions as in the previous examples the same kind of specimens were exposed to pure carbon dioxide and to carbon dioxide containing 2.2 v/o carbon monoxide and 540 p.p.m. of methane. The weight loss was reduced in the presence of methane and carbon monoxide by a factor of 15 whereas a similar carbon monoxide concentration without methane gave a factor of reduction of only 1.6.

To illustrate the effect of methane and other hydrocarbons under irradiation pure carbon dioxide and carbon dioxide containing respectively methane, ethane, propane n-butane and neo-pentane were passed over carbon-14 labelled graphite specimens disposed in the neutron flux of an experimental reactor and the carbon-14 activity in the outlet gas was determined for each mixture as representing the rate of attack of the graphite specimen. The inhibition factor for each mixture compared with pure carbon dioxide was then calculated as a ratio $$\frac{\text{activity in pure CO}_2}{\text{activity in mixture}}$$

The following results were obtained:

The advantages of maintaining the concentration of water

TABLE I

| Expt. No. | Sampling Position | Analytical Results, v.p.m. | | | | | | | | Inhibition Factor |
|---|---|---|---|---|---|---|---|---|---|---|
| | | CO | $H_2$ | $H_2O$ | $CH_4$ | $C_2H_6$ | $C_3H_8$ | $n\text{-}C_4H_{10}$ | $neo\text{-}C_5H_{12}$ | |
| 1 | Inlet | 4,800 | <10 | 40 | 190 | | | | | 6.2–8.2 |
| | Outlet | 4,800 | 60 | 90 | 110 | | | | | |
| 2 | Inlet | <10 | <10 | 20 | <5 | 340 | | | | 20–27 |
| | Outlet | 1,400 | 180 | 520 | 25 | <10 | | | | |
| 3 | Inlet | <20 | <10 | <30 | <5 | <20 | 195 | | | 32–40 |
| | Outlet | 1,000 | 80 | 420 | 60 | N.D. | N.D. | | | |
| 4 | Inlet | <100 | <10 | 250 | <5 | | | 200 | | 65–95 |
| | Outlet | 1,100 | 80 | 550 | 80 | N.D. | N.D. | N.D. | | |
| 5 | Inlet | <20 | <10 | 20 | <5 | <20 | (present) | | 200 | >120 |
| | Outlet | 1,400 | 40 | 450 | 180 | 60 | | | | |

N.D. = Not determined.

The following results also obtained with the use of carbon–14 labelled graphite specimens illustrate the effect of varying quantities of methane in the coolant:

vapour at a low level is shown by the graph of FIGURE 2 which illustrates the effect on coolant containing 400 p.p.m. of methane and 0.2–0.5% carbon monoxide.

TABLE II

| Expt. No. | CO, vol. percent | | $CH_4$, v.p.m. | | $H_2$, v.p.m. | | $H_2O$, v.p.m. | | Inhibition Factor |
|---|---|---|---|---|---|---|---|---|---|
| | In | Out | In | Out | In | Out | In | Out | |
| 1* | 0.48 | 0.48 | 190 | 110 | <10 | 60 | 40 | 90 | 6.2–8.2 |
| 6 | 0.42 | 0.34 | 380 | 190 | <10 | 60 | 20 | 120 | 8–10 |
| 7 | 0.43 | 0.46 | 430 | 380 | <10 | 110 | 40 | 180 | 14.9–17.9 |
| 8 | 0.44 | 0.47 | 490 | 360 | <10 | 90 | 40 | 180 | 16–20 |
| 9 | 0.33 | 0.38 | 790 | 500 | <10 | 130 | 20 | 250 | 25–33 |
| 10 | 1.22 | 1.14 | 180 | 135 | <10 | 50 | 30 | 35 | 5.7–7.5 |
| 11 | 0.83 | 0.85 | 300 | 190 | <10 | 90 | 50 | 45 | 9.2–10.8 |
| 12 | 0.87 | 0.85 | 300 | 180 | <10 | 110 | 35 | 40 | 8.0–10.6 |
| 13 | 1.67 | 1.64 | 85 | 55 | <10 | 60 | 60 | 15 | 3.0–3.8 |
| 14 | 1.82 | 1.82 | 440 | 340 | <10 | 170 | 20 | 50 | 13–19 |
| 15 | 1.7 | 1.8 | 450 | 400 | <10 | 100 | 40 | 45 | 17.5–22.5 |
| 16 | 1.51 | 1.47 | 930 | 750 | <10 | 110 | 45 | 110 | 37–49 |
| 17 | 5.4 | 5.0 | 430 | 340 | 20 | 100 | 40 | 80 | 10.7–14.7 |
| 18 | nil | 0.10 | 540 | 250 | <10 | 130 | 48 | 400 | 10–12 |
| 19 | 0.52 | 0.56 | 480 | 330 | 950 | 760 | 40 | 270 | 10–12 |
| 20 | 1.07 | 1.15 | 2,400 | 2,000 | 550 | 590 | 60 | 420 | 60–80 |

*From Table I.

As explained in the paper by Lind and Wright (B.N.E.S. Symposium—The Advanced Gas Cooled Reactor—Paper No. 20), the $CO_2$-graphite reaction rate is proportional to the energy absorbed by coolant gas in the pores of the graphite. The extent of the reaction in a nuclear reactor will thus depend on the amount of coolant gas in the pores of the graphite and that in turn will depend on the coolant pressure and the open pore volume of the graphite. Consequently, the problem of graphite corrosion increases with coolant pressure. The extent of the reaction also depends on the energy flux. It is therefore necessary to increase the inhibition factor as the energy flux of reactors is increased. For example, in a reactor of the Magnox type having an energy flux in the region of 3 mw./adjacent tonne it is considered that the presence of 400 v.p.m. of methane will give adequate protection but when the energy flux is increased by using clusters of fuel elements instead of single elements (as in the Windscale Advanced Gas Cooled Reactor which has an energy flux in the region of 20 mw./adjacent tonne) it is considered desirable that the methane concentration should approach 1000 v.p.m. The effect of the presence of approximately this quantity of methane in the Windscale Advanced Gas Cooled Reactor is shown in the graph of the accompanying FIGURE 1 which relates to a system also containing 0.4% carbon monoxide and between 200 and 300 v.p.m. of water. The results were obtained by insertion of carbon-14 labelled specimens in the reactor and are expressed as a reduction in the G(—C) value, that is, the number of carbon atoms removed from the graphite matrix per 100 e.v. of energy absorbed by the gas in the pores of the graphite, the energy absorption being determined calorimetrically. In the absence of methane the G(—C) value was 1.

The more water vapour present in the coolant the more methane required to produce a given inhibition factor.

Water vapour is formed by breakdown of the added methane under irradiation. Removal of the water vapour is therefore required so long as methane additions are being made to the coolant. A conventional drier may be used.

Hydrogen is also formed by breakdown of the methane. If necessary, it may be removed by oxidation which would remove excess carbon monoxide at the same time.

We claim:
1. A method of reducing the loss of carbon from a graphite moderator in a carbon dioxide-cooled nuclear reactor, the method comprising the step of introducing a fluid paraffin hydrocarbon into the carbon-dioxide coolant, to maintain a concentration of at least 50 parts per million by volume of paraffin hydrocarbon in the coolant, wherein at least some carbon monoxide is also present in the coolant.

2. A method according to claim 1 wherein the paraffin hydrocarbon is methane.

3. A method according to claim 1 wherein the paraffin hydrocarbon contains between two and five carbon atoms.

References Cited by the Examiner

UNITED STATES PATENTS

| 2,998,388 | 8/1961 | La Lande et al. | 252—67 |
| 3,108,051 | 10/1963 | Lindstrom | 176—38 |
| 3,126,348 | 3/1964 | Meijer | 252—67 |
| 3,183,166 | 5/1965 | Schweitzer et al. | 176—38 |

FOREIGN PATENTS

| 874,487 | 8/1961 | Great Britain. |
| 917,820 | 2/1963 | Great Britain. |

L. DEWAYNE RUTLEDGE, *Primary Examiner.*